(12) United States Patent
Moser et al.

(10) Patent No.: US 9,816,612 B2
(45) Date of Patent: Nov. 14, 2017

(54) HOLLOW PISTON

(71) Applicant: Elkhart Products Corporation, Geneva, IN (US)

(72) Inventors: Shawn Gene Moser, Craigville, IN (US); Gary Wayne Brunner, Berne, IN (US); David Dee Thomson, Fremont, IN (US)

(73) Assignee: Elkhart Products Corporation, Geneva, IN (US)

( * ) Notice: Subject to any disclaimer, the term of this patent is extended or adjusted under 35 U.S.C. 154(b) by 260 days.

(21) Appl. No.: 14/667,920

(22) Filed: Mar. 25, 2015

(65) Prior Publication Data

US 2016/0281848 A1 Sep. 29, 2016

(51) Int. Cl.
| | |
|---|---|
| *F16J 1/00* | (2006.01) |
| *F04B 39/00* | (2006.01) |
| *B23P 15/10* | (2006.01) |
| *G06Q 50/04* | (2012.01) |
| *F04B 27/08* | (2006.01) |

(52) U.S. Cl.
CPC ............ *F16J 1/001* (2013.01); *B23P 15/10* (2013.01); *F04B 27/0878* (2013.01); *F04B 39/0005* (2013.01); *G06Q 50/04* (2013.01); *Y10T 29/49249* (2015.01)

(58) Field of Classification Search
CPC .. B23P 15/10; F04B 39/0005; F04B 27/0878; F16J 1/001; F16J 1/00; G06Q 50/04; B21C 37/151; B21C 37/16; Y10T 29/49249; F16C 2220/80; F16C 29/02; F15B 15/1466; B63B 3/48; E21F 17/107
See application file for complete search history.

(56) References Cited

U.S. PATENT DOCUMENTS

| | | | |
|---|---|---|---|
| 2,837,880 A * | 6/1958 | Rosenblatt | H01J 9/40 53/403 |
| 3,475,786 A * | 11/1969 | Pearson | B29C 31/002 425/143 |
| 5,630,353 A | 5/1997 | Mittlefehldt et al. | |
| 5,851,320 A | 12/1998 | Auran et al. | |
| 6,530,149 B2 | 3/2003 | Sugiura et al. | |
| 6,725,910 B2 * | 4/2004 | Ishida | B21C 37/151 165/104.21 |
| 6,941,852 B1 | 9/2005 | Le et al. | |
| 7,275,409 B1 * | 10/2007 | Wu | B21D 22/025 29/890.032 |
| 2012/0260882 A1 | 10/2012 | Martins et al. | |

FOREIGN PATENT DOCUMENTS

| | | | |
|---|---|---|---|
| CN | 105480376 A | * | 4/2016 |
| CN | 205349422 U | * | 6/2016 |

OTHER PUBLICATIONS

"Balloon-O-Therapy Twisting Balloons with FewDolt" with published date of Mar. 10, 2013 (wayback machine date of Jul. 19, 2013). https://web.archive.org/web/20130719201940/http://balloonotherapy.blogspot.com/2013/03/letterballoontwistingabc.html.*
International Search Report dated Jun. 25, 2015 for PCT/US15/22392.

* cited by examiner

*Primary Examiner* — Sarang Afzali
(74) *Attorney, Agent, or Firm* — Shumaker, Loop & Kendrick, LLP

(57) ABSTRACT

Disclosed are hollow pistons made from a single piece of starting material and methods of manufacturing hollow pistons from the single piece of starting material.

3 Claims, 6 Drawing Sheets

FIG. 1A
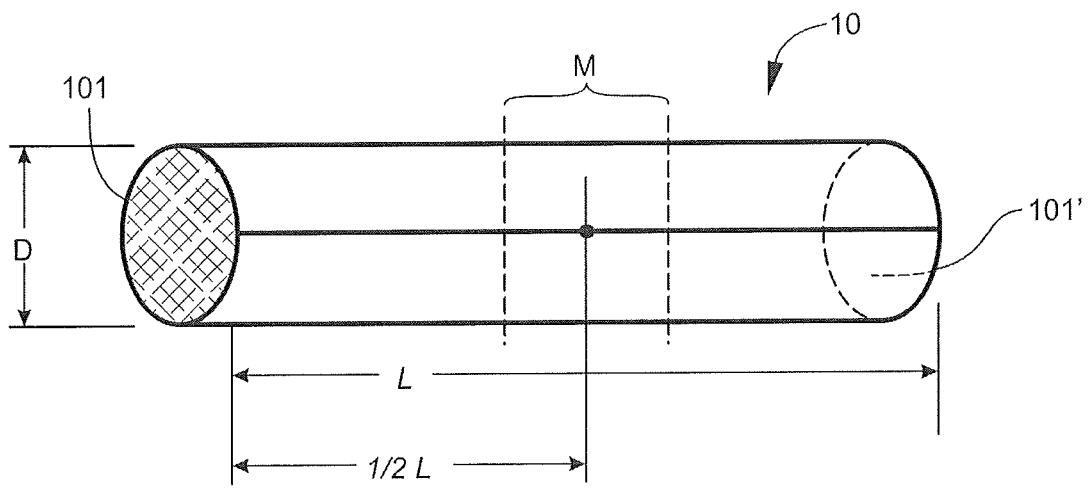
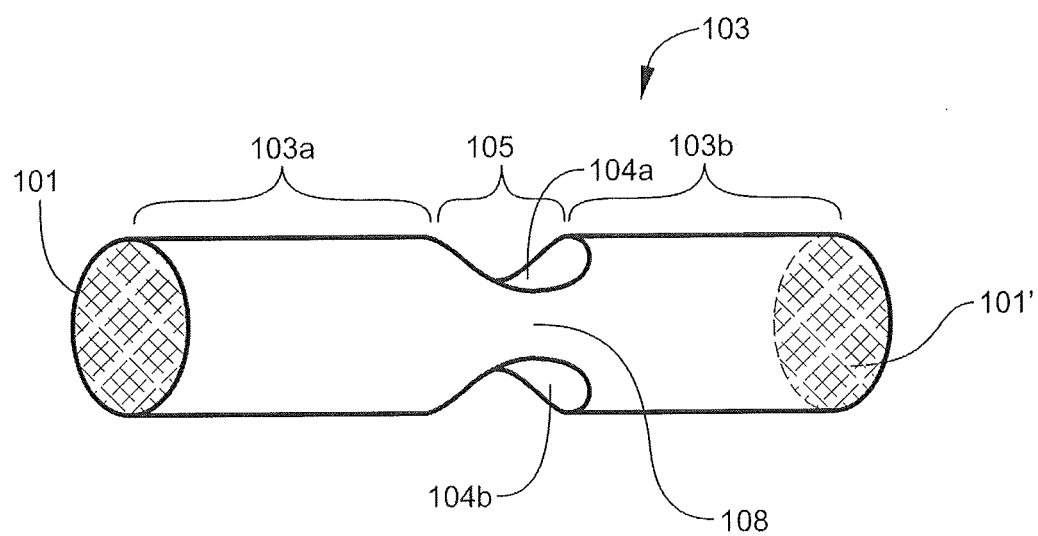
FIG. 1B

HOLLOW PISTON

TECHNICAL FIELD

This disclosure generally relates to hollow pistons, and more specifically to hollow pistons formed from a single piece of material that may be used, for example, in compression systems.

BACKGROUND

A common type of compression system used in a motor vehicle air conditioner is the positive displacement compressor, which may be the fixed or variable displacement type. Although there are a variety of compressor configurations, such positive displacement compressors generally operate on the same basic principle: a certain inlet volume of gas is confined in a given space, compressed as the size of the space is reduced, and then expelled at the higher pressure.

One type of positive displacement compressor incorporates reciprocating pistons to impart compression. In one compressor design, a solid cylindrical piston moves axially within a cylindrical bore in the compressor housing. On the down stroke (or suction stroke), a low pressure area is created, causing gas in a suction line to pass through a suction valve into the compression chamber. On the up stroke (or compression stroke), the gas in the compression chamber is compressed as the area in which the gas is held (or clearance space) is reduced. At a certain pressure, the compressed gas is released through a discharge (or delivery) valve into a discharge line. Ultimately, this cycle results in the release of chilled air into the interior of the motor vehicle. The linear upward and downward motion along the axis of the bore is articulated to each piston through an attached connecting rod and/or piston rod, and associated crankshaft, wobble surface, swash surface, cam surface, or other known piston actuator.

Due to the number of cycles that the piston undergoes during operation, piston failure, and thus compressor failure, is often attributable to wear experienced by the piston components. The wear experienced in a system with a solid reciprocating piston is particularly significant, as the weight of the piston increases stress on joints and the entire conditioning system. The greater the weight of the components, especially of the piston, the greater the risk of mechanical failure, for example, at welds or other points susceptible to fatigue and friction. Thus, overall piston life is not as great as is often desired. A further disadvantage of solid pistons is that they require additional work to actuate, reducing the overall efficiency of the compressor and air conditioning unit. The reduced efficiency and amount of material required add to the cost of solid pistons.

In another compressor design, hollow pistons are used as an alternative to solid pistons. However, known hollow pistons are not well accepted, particularly in the context of motor vehicle air conditioner compressors. In one respect, this is because known hollow pistons are formed from separate pieces of material. Creating a hollow piston from separate pieces of material increases the complexity and cost of manufacturing the piston, creates waste through scrap material created by circular cutouts, and increases susceptibility to wear, stress, and damage (e.g., at the weld site where the inner and outer portions are attached to the middle surface of the piston). Friction, for example, may cause pieces that have been joined together to break apart from one another. Accordingly, there is a need for a lower cost piston assembly that has good stability and performance relative to known solid and hollow pistons and that can be implemented in current or future compressor designs.

BRIEF SUMMARY

Embodiments of the present disclosure relate to a durable, unitary hollow piston that can be manufactured in an economical manner under the control of a computerized system from a single piece of material. This concept is advantageous because it produces a superior hollow piston and actuator anchor, from a single piece of starting material, such as a solid metal rod, using less material and producing less waste than conventional solid pistons or conventional hollow pistons. Thus, the disclosed methods are more efficient and produce hollow pistons that are less susceptible to structural fatigue than conventional solid pistons, conventional hollow pistons, and the currently used methods for manufacturing these conventional pistons.

In one embodiment, a computerized system receives and maintains information on the attributes of a rod and unitary hollow pistons and parameters for manufacture of same. The computerized system executes stored procedures controlling the manufacturing equipment, for example, a lathe, band saw, grinder, hydraulic or pneumatic press, heaters, and other metal working tools, to concurrently form two or more unity hollow pistons having an outer portion, hollow body, and inner portion all formed from the same length of solid rod material.

Notches are cut into the middle section of the rod, creating a first and second piston linked by a connecting strip. The body, featuring a hollow core, and the inner portion of each piston is formed by heating the notched rod until malleable and then pressing (e.g., hydraulically or pneumatically) a die into each rod end. The hollow body and inner portion is smoothed, evened, and/or centered as needed with, for example, a lathe or other suitable automated metal working tools under control of the computerized system and in accordance with a specification for the hollow piston assembly stored therein. In one embodiment, the hollow core is cylindrical and the wall thickness of the piston's hollow body is substantially uniform. The outer portion of the piston assembly is formed by folding the outer section of each hollow body inward. The two piston assemblies are then separated by cutting at the connecting strip.

In certain aspects, disclosed is a product having two hollow pistons linked by a connecting portion, wherein each hollow piston is an air tight, hollow cylindrical body formed from a single piece of material (e.g., an elongate solid rod as a starting material). The two hollow pistons linked by the connecting portion may have a dumbbell shape (e.g., a symmetrical or an asymmetrical dumbbell shape) with at least one piston having a larger diameter than the connecting portion. In certain aspects, at least one piston may have a larger inner diameter than the connecting portion's outer diameter. In each of these aspects, each piston may have end portions that are orthogonal relative to the longitudinal axis of the connecting portion when the two hollow pistons are linked by the connecting portion.

Also disclosed are two hollow pistons formed by a process including: providing a solid rod; cutting a notch mid-span along the longitudinal axis of the solid rod to produce a notched rod; heating the notched rod; pressing opposing ends of the notched rod to produce a hollow cylindrical body; and folding an outer portion of each hollow cylindrical body inward to produce two hollow pistons linked by a connecting strip. In certain aspects, the opposing ends of the notched rod are positioned along the longitudinal axis of the notched rod. In certain aspects, the outer portions of each hollow cylindrical body are the circumferential edges of the hollow cylindrical body along the longitudinal axis of the notched rod, which are pressed inward in, for example, a radially undulating manner to produce the hollow pistons. In certain aspects, the two hollow pistons may be separated by, for example, cutting the connecting portion.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying FIGURES, in which:

FIGS. 1A to 1H depict various stages and cross-sectional views for forming two hollow pistons from a single solid rod according to one embodiment;

DETAILED DESCRIPTION

Figure 1C:
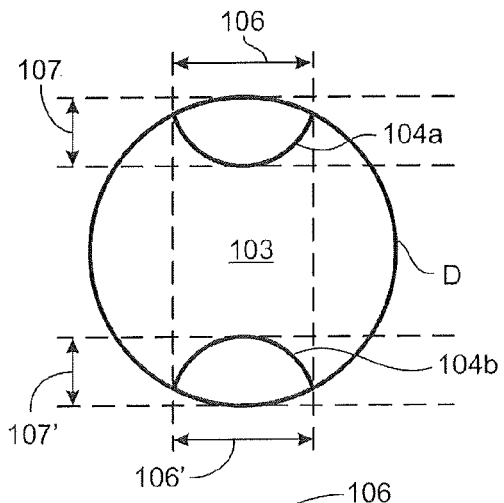

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. The concept described herein provides a unitary hollow piston and a method of manufacturing same. The hollow piston is manufactured in an economical manner under control of a computerized system executing stored procedures according to received and stored hollow piston attributes and manufacturing process parameters.

In one embodiment, the computerized system executes algorithms to control equipment, for example, a lathe, band saw, grinder, hydraulic or pneumatic press, heater, and other metal working tools to concurrently form two or more unitary hollow pistons each having an outer portion, hollow body, and inner portion. Each portion of the hollow piston is formed from a single length of solid rod material in a continuous and automated process without welding or otherwise joining separate pieces of material. The rod material may be a metal or metal alloy. For example, the rod material may be aluminum, steel, or another material that is suitable for the environment in which the piston will be installed, such as a compressor.

In certain aspects, the starting material is a solid rod. The rod is typically circular in cross section, but may be any desired cross sectional shape. Under control of the computerized system, one or more notches of a selected shape and dimension are cut into the middle section of the rod, e.g., at or in the vicinity of the half length of the rod. In one embodiment, two symmetrical notches are created by the computer controlled manufacturing equipment across from one another at opposite portions of the rod along the rod's circumference. In another embodiment, there is a single notch in the form of a groove extending around the complete or nearly complete circumference of the rod. This notching process divides the rod into first and second piston of roughly equal length. If two different sized piston assemblies are desired, the location of the notch(es) may be shifted toward one end of the piston.

Next, the rod is heated until sufficiently malleable to form the hollow body of each piston. To do so, a die in a desired shape for each hollow core is pressed (e.g., hydraulically or pneumatically) into a center portion of each end of the rod, thereby creating a cavity or void defining the hollow body. Each cavity is smoothed, de-burred, evened, and/or radially centered, as needed with, for example, a lathe, in conformity with the rules maintained on the computerized system controlling the lathe and other manufacturing equipment. The hollow cores created in the first and second portions of a single rod may be mirror images of one another, or have different dimensions. Hence, two different pistons of varying dimensions may be concurrently produced.

The inner portion of each piston is formed as inward pressure is applied to the rod, causing the rod material to compress, bend, and form a flat surface orthogonal to that of the hollow body. Like the hollow body and inner portion, the outer portion of each piston assembly is formed by shaping the original rod material. Based on stored process parameters (e.g., bend radius, bend degree, bend allowance, and bend angle) and attributes of the rod and pistons (e.g., material composition, hardness, length, and diameter), pressure is applied to the outer section of each piston hollow body. This creates radial undulating folds as the rod material bends inward toward the rod's longitudinal axis. The computer controlled equipment continues to press the outer section of each hollow body inward until an outer portion is formed that is orthogonal to the hollow body and parallel to the inner portion. Upon completion of the folding action, the outer portion forms an air tight seal with the hollow body.

The two hollow pistons, each having an outer portion, hollow body, and inner portion formed from the same length of rod material, are separated by cutting them apart at or near the notches. At any stage of the process, any surface of the hollow pistons may be de-burred, grained, filed, evened, centered, and/or smoothed as needed using the appropriate metal working tools known to the skilled artisan.

FIGS. 1A to 1H illustrate various stages of forming two unitary hollow pistons 115*a*, 115*b* from a solid rod 10 according to one embodiment. As depicted in FIG. 1A, the manufacturing process begins with a solid rod 10 having an original length L, original diameter D, opposing ends 101, 101', half-length ½ L, and middle section M.

A piston assembly manufacturing process according to the embodiments disclosed herein can accommodate a broad variety of rod dimensions, shapes, and materials. An exemplary range for L is 1 inch to 6 inches and for D is 1 inch to 4 inches. In one embodiment, for example, rod 10 is 3 inches and D is 2 inches. An exemplary rod has a uniform circular cross-section across its length, but other variations may be utilized. Exemplary materials include aluminum, steel, and other metal-based alloys. In one embodiment, for example, rod 10 is a metal alloy. Dimensions, shapes, and materials will vary, as will be appreciated by the skilled artisan, based on the attributes of the rod, pistons, and compression system.

Figure 1D:
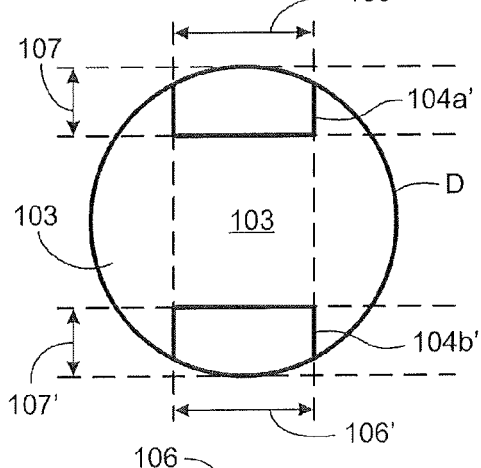
Figure 1E:
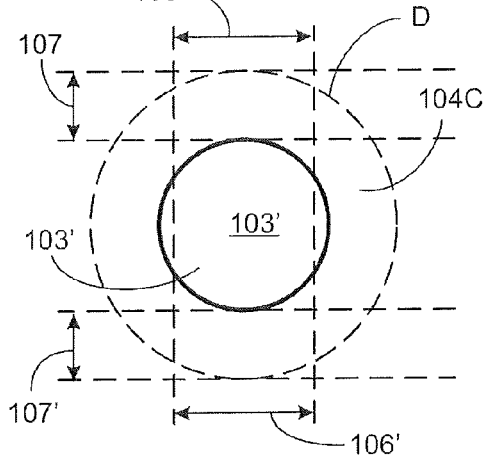
Figure 1F:
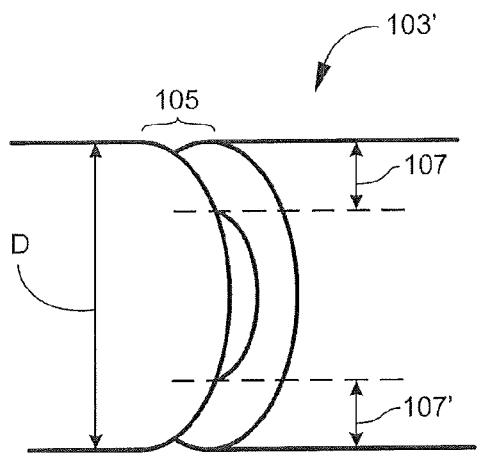

FIG. 1B depicts a notched rod 103, made from solid rod 10 according to the computerized process disclosed herein. Notched rod 103 has notches 104*a*, 104*b* at middle section M joining first end 103*a* of notched rod and second end 103*b* of notched rod. In certain aspects, first and second ends 103*a*, 103*b* are configured to form hollow pistons 115*a*, 115*b* shown in FIG. 1H. As illustrated in FIGS. 1B to 1F, each notch has notch length 105, notch width (or an arc length depending on the shape of the notch) 106, 106', and notch depth 107, 107'. A variety of notch shapes, numbers, and dimensions can be employed in this process. Exemplary embodiments include curvilinear and rectangular notches. A cross-sectional view of a pair of curvilinear and rectangular notches are depicted in FIGS. 1C and 1D, respectively; however, other shapes and number of notches may be implemented. Notches 104*a*, 104*b* and 104*a'*, 104*b'* may be symmetrical or asymmetrical in shape, dimension, and location on notched rod 103. In one embodiment, FIGS. 1C and 1D depict notches 104*a*, 104*b* and 104*a'*, 104*b'*, respectively, being located at opposite circumferential sides of the notched rod 103. In another embodiment, FIG. 1E (cross-sectional view) and FIG. 1F (side view) depict notch 104*c* as a groove extending completely around the circumference of notched rod 103'. As with notches 104*a*, 104*b* and 104*a'*, 104*b'*, notch (or groove) 104*c* may be a variety of shapes, numbers, and dimensions. Regardless of shape, number, or dimension, the aforementioned notch(es) at middle section M divide notched rod 103, 103' into first and second ends 103*a*, 103*b*, which are joined by connecting strip 108. Connecting strip 108 is the material that remains after creating the notches in notched rod 103, 103'.

Figure 1G:
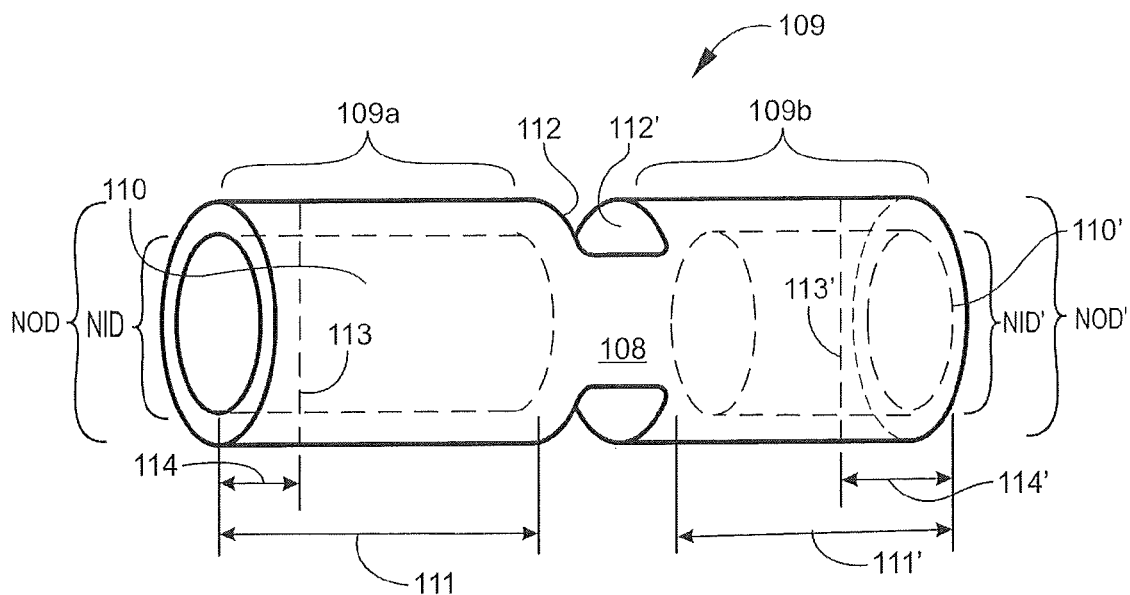

FIG. 1G depicts hollowed rod 109 made from notched rod 103 according to the computerized process disclosed herein. In this aspect, notched rod 103 was heated and inward pressure was applied to opposing ends 101, 101' thereby displacing portions of the notched rod 103 and forming hollow, cylindrical bodies 110, 110' of piston precursors 109*a*, 109*b* in the hollowed rod 109. Hollow, cylindrical bodies 110, 110' have lengths 111, 111', new outer diameters NOD, NOD' (greater than diameter D of rod 10 and notched rod 103, 103'), and inner diameters NID, NID'. Inward pressure applied to each end of the rod also creates inner portions 112, 112', which are flat surfaces orthogonal to each hollow body and immediately adjacent to and positioned on opposites sides of connecting strip 108.

Figure 1H:
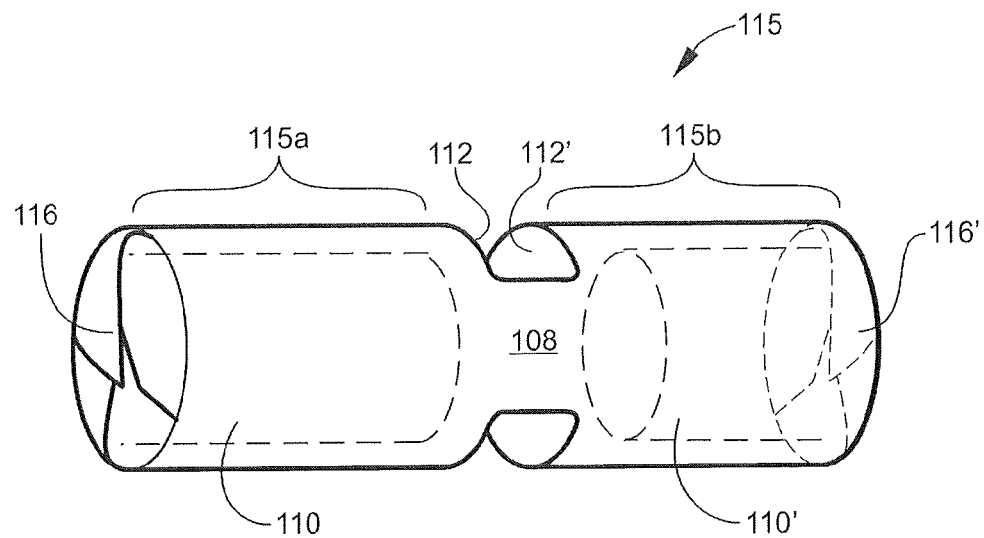

Still with reference to FIG. 1G, imaginary lines 113, 113' identify the boundary of outer sections 114, 114' of piston precursors 109*a*, 109*b*. Through an inward folding action, outer sections 114, 114' are turned into outer portion 116, 116', as depicted in FIG. 1H. FIG. 1H, illustrates pistons 115*a*, 115*b* after outer sections 114, 114' have been folded inward to form outer portions 116, 116' that are preferably airtight. Outer portions 116, 116' are orthogonal to hollow bodies 110, 110' and parallel to inner portions 112, 112'. In certain aspects, pistons 115*a*, 115*b* are separated by making one or more cuts at connecting strip 108. The pistons preferably remain airtight after being separated from one another.

Figure 2:
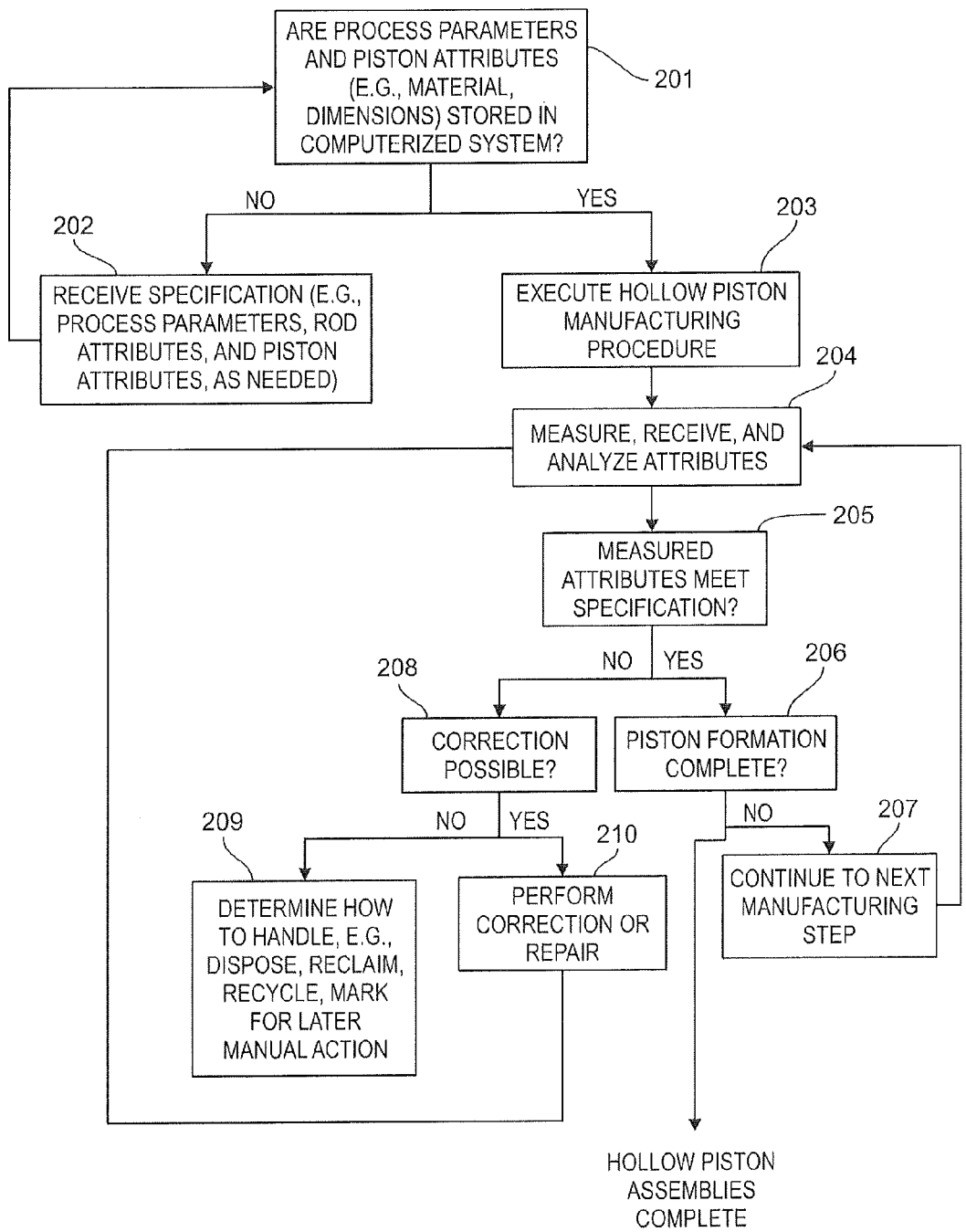
FIG. 2 illustrates a flow diagram for a computerized process according to one embodiment.

FIG. 2 illustrates a flow diagram for a computerized process according to one embodiment. Process 201 determines whether a computerized system contains a specification, including process parameters and piston/rod attributes for making hollow pistons. Exemplary process parameters include equipment type and equipment settings (e.g., temperature, pressure, bend radius, bend degree, bend allowance, and bend angle). Exemplary rod and piston attributes include shape, dimensions (e.g., length, width, thickness), material composition, and hardness. If additional information is needed to manufacture the hollow pistons, process 202 allows the computerized system to receive and store information concerning new and/or amended process parameters, rod attributes, piston attributes, or other specification.

Process 203 executes a stored routine controlling manufacturing equipment to make hollow pistons according to the process described herein. Process 204 instructs the manufacturing equipment to take measurements at various stages of manufacturing, receive those measurements of rod and piston attributes, and analyze those measurements. If process 205 determines that the measured values conform to the specification, manufacturing proceeds according to process 207 until process 206 determines piston formation is complete. In one embodiment, the system measures the length L of rod 100 before instructing manufacturing equipment to cut notches. This measured value is compared to the minimum and maximum value for L stored in the computerized system as a rod attribute. If the length L is within the range permitted, hollow piston manufacturing continues.

If at any time during manufacturing, process 205 determines that any measured attribute is outside the specification, process 208 determines whether a repair or correction can be made to prevent the piston from being scrapped or taken off-line. If on-line repair or correction is not possible, process 209 determines the response and course of action to be taken for the non-compliant material, for example, sending the non-compliant material to the scrap or reclaim/recycle bin, logging the error in the computerized system, and/or marking for manual inspection, correction, or repair. If, on the other hand, an in-line repair or correction is possible, process 210 of the computerized system executes algorithms instructing the manufacturing equipment to make the desired repair or correction. Process 204 measures, receives, and analyzes attributes of the corrected/repaired material and the iterative process of measuring and manufacturing continues until all measurements comply with all specifications and all manufacturing steps have been performed.

Hence, processes 204 et seq. are iterative, continuing until process 206 determines hollow pistons have been completely formed in accordance with the specification stored by the computerized system, or until process 209 handles a non-compliant piston.

Figure 3:
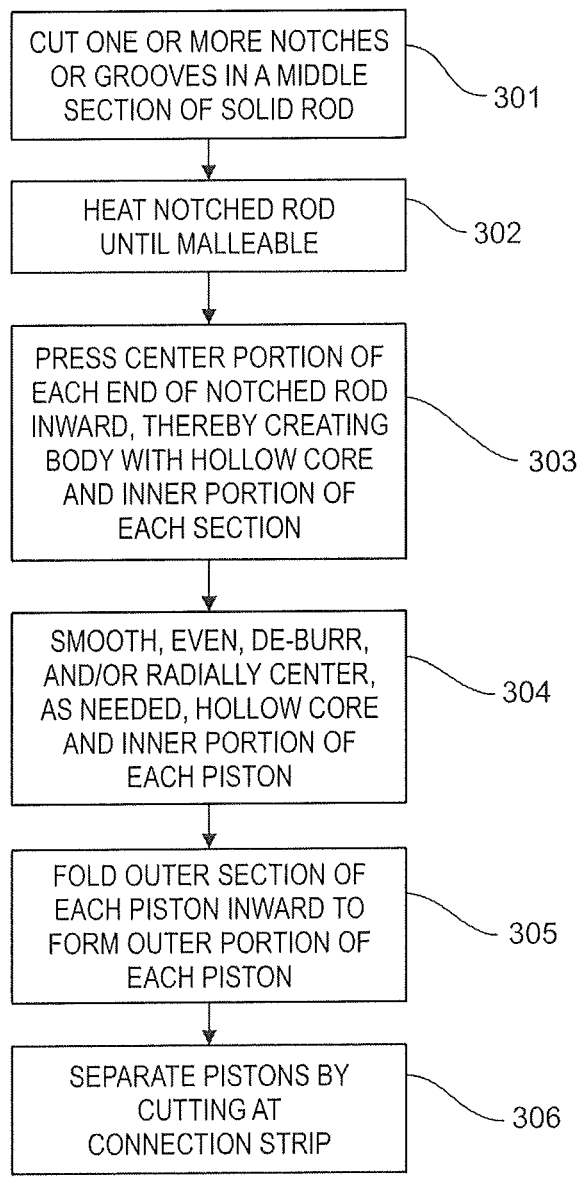
FIG. 3 illustrates a flow diagram for a computerized process according to one embodiment.

FIG. 3 illustrates a flow diagram for a computerized process according to a specification for hollow piston manufacture. Process 301 executes instructions commanding manufacturing equipment to cut one or more notches or grooves at the middle section of the solid rod material, dividing the rod into a first and second piston joined by a connecting strip. Process 302 executes instructions commanding manufacturing equipment to heat the notched rod until sufficiently malleable for process 303. Process 303 executes instructions commanding manufacturing equipment to press a cavity into the center of the first and second pistons. This pressing creates, for each piston, a hollow body and an inner portion orthogonal to the hollow body. Process 304 executes instructions commanding manufacturing equipment to smooth, even, de-burr, and/or center the hollow core of each piston body and the inner portion, as needed. Process 305 executes instructions commanding manufacturing equipment to fold the outer section of each hollow body inward to form an outer portion for each piston. Process 306 executes instructions commanding manufacturing equipment to separate the first and second pistons by making one or more cuts at the connecting strip.

The aforementioned hollow piston assemblies are manufactured under control of a computerized system maintaining computer-executable instructions. Thus, various elements of embodiments are in essence the software code defining the operations of such various elements (e.g., code controlling the processes discussed with reference to FIGS. 2-3 and resulting in the physical embodiments described with reference to FIGS. 1A-1H). The executable instructions or software code may be obtained from a tangible readable medium (e.g., a hard drive media, optical media, RAM, EPROM, EEPROM, tape media, cartridge media, ROM, thumb drive, and/or the like). In fact, readable media can include any tangible readable medium that can store information.

Figure 4:
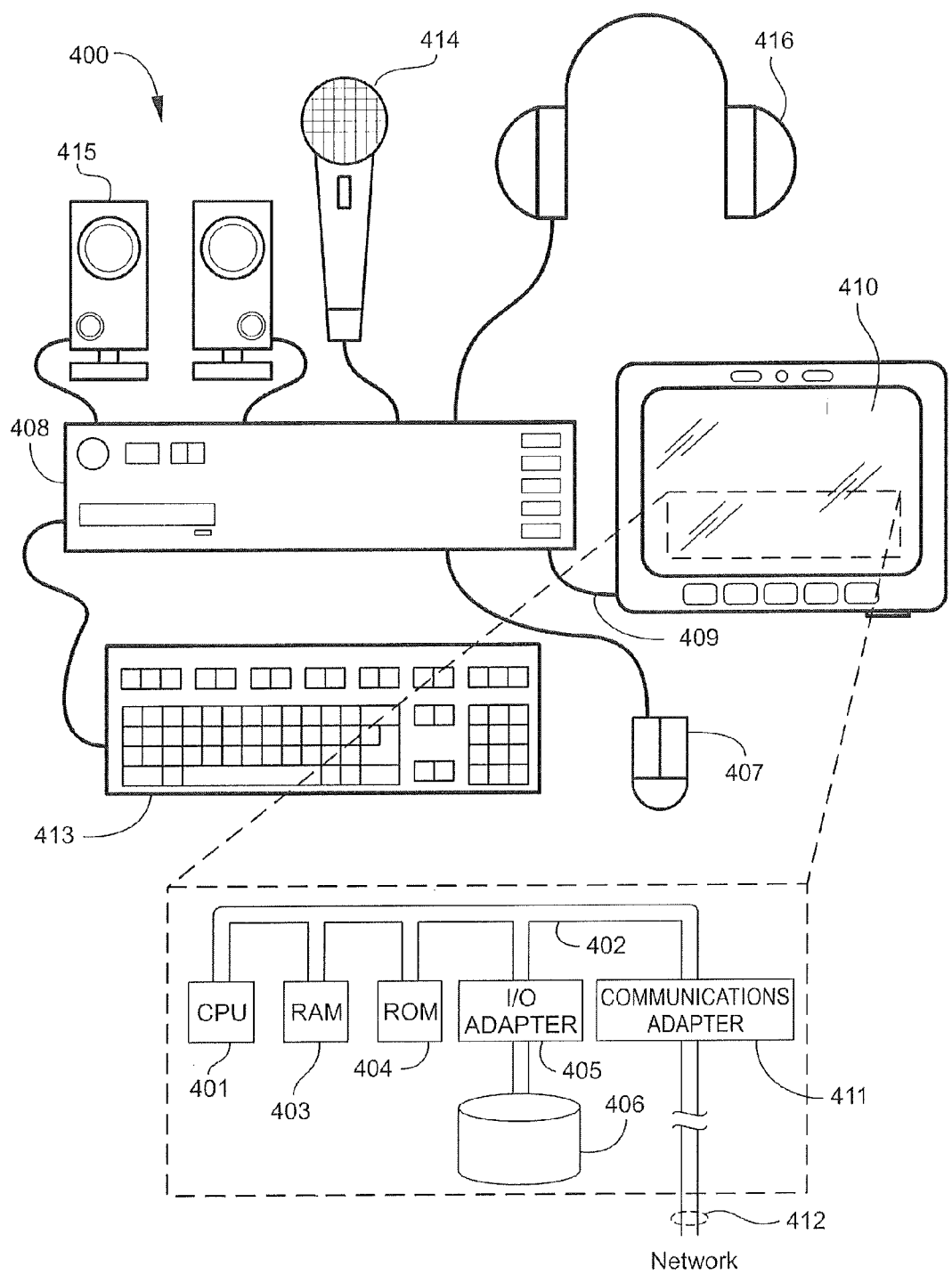
FIG. 4 illustrates an exemplary computer system or computerized system adapted for forming the hollow pistons according to one embodiment.

FIG. 4 illustrates an example computerized system 400 adapted according to one embodiment. That is, computerized system 400 comprises an example system on which embodiments of the present invention may be implemented. Computerized system 400 includes a processor (CPU) 401 that is coupled to system bus 402. Processor 401 may be any general purpose or specialized purpose CPU. However, the present invention is not restricted by the architecture of CPU 401 so long as CPU 401 supports the inventive operations as described herein. CPU 401 may execute the various logical instructions according to embodiments of the present invention. For example, one or more CPUs, such as CPU 401, may control operation of manufacturing equipment, measurement and analysis of process parameters and attributes, as well as other processes discussed with reference to FIGS. 1A-1H, 2, and 3 above).

Computerized system 400 also preferably includes random access memory (RAM) 403, which may be SRAM, DRAM, SDRAM, or the like. In this example, computerized system 400 uses RAM 403 to store, for example, a hollow piston assembly specification (including process parameters and rod and piston attributes such as equipment type, equipment settings, temperature, pressure, bend radius, bend degree, bend allowance, and bend angle, shape, dimensions, material composition, and hardness). Computerized system 400 preferably includes read-only memory (ROM) 404 which may be PROM, EPROM, EEPROM, or the like. RAM 403 and ROM 404 hold user and system data and programs, as is well known in the art.

Computerized system 400 also preferably includes input/output (I/O) adapter 405, communications adapter 411, and user interface and/or display adapter 408. I/O adapter 405, user interface/display adapter 408, and/or communications adapter 411 may, in certain embodiments, enable a user to interact with computerized system 400 in order to input information, e.g., a specification, or retrieve stored information such as previously used specifications, and measurements or analysis performed during manufacture of hollow piston assemblies.

I/O adapter 405 preferably connects to storage device(s) 406, such as one or more of hard drive, portable media device, compact flash memory card, memory stick, mini or micro Secure Digital (SD) card, compact disc (CD) drive, floppy disk drive, tape drive, etc. to computerized system 400. The storage devices may be utilized when RAM 403 is insufficient for the memory requirements associated with storing media data. Communications adapter 411 is preferably adapted to couple computerized system 400 to network 412 (e.g., the Internet, a LAN, a cellular network, etc.). User interface/display adapter 408 and display adapter 409 (e.g., couple (e.g., via a generalized receptacle, such as a USB (Universal Serial Bus), or other specialized receptacle) external user input devices to computerized system 400.

In one embodiment, CPU 401, RAM 403, ROM 404, I/O adapter 405, storage device 406, communications adapter 411 are integrated into computerized system 400. In one embodiment, user input devices are also integrated into computerized system 400, for example, microphone 414 and speakers 415 (e.g., for capturing and playing audio, warning sounds, alerts, or manufacturing process status updates). Alternatively, computerized system 400 may be adapted to couple to external devices, for example, at receptacle 409. External devices may include user input devices such as keyboard 413, pointing device 407, and microphone 414 and/or output devices, such as speaker(s) 415, headphones 416, and display 410. Storage device 406 and communications adapter 411 may also be external components coupled to computerized system 400 at a suitable port (not shown) of computerized system 400.

Further, computerized system 400 includes cameras or other measurement devices (not shown) to capture measurements during the manufacturing process. Computerized system 400 may also include various switches, buttons, or like user controls to permit further user input and control of, or short-cut access to, processes and functions of computerized system 400.

While FIG. 4 shows a desktop computer, it should be noted that the exact configuration of a portion of a system according to various embodiments may be somewhat different. For example, computerized system 400, according to one or more embodiments, may be any kind of processor-based device. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations may be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. Two hollow pistons linked by a connecting strip formed by a process comprising:
   a) providing a solid rod;
   b) cutting a notch mid-span along a longitudinal axis of the solid rod to produce a notched rod;
   c) heating the notched rod;
   d) pressing opposing ends of the notched rod to produce hollow cylindrical bodies at opposing ends of the notch rod; and
   e) folding an outer portion of each hollow cylindrical body inward to produce the two hollow pistons linked by a connecting strip, wherein
   the connecting strip has a smaller diameter than at least one of the pistons and each of hollow piston is air tight.

2. The two hollow pistons of claim 1, wherein the opposing ends of the notched rod of step (d) are positioned along a longitudinal axis of the notched rod.

3. The two hollow pistons of claim 1, further comprising:
   f) separating the two hollow pistons of step (e) to produce individual hollow pistons.

* * * * *